DE COURCY NEAL.
TIRE CASING.
APPLICATION FILED JUNE 30, 1916.
1,341,663.
Patented June 1, 1920.
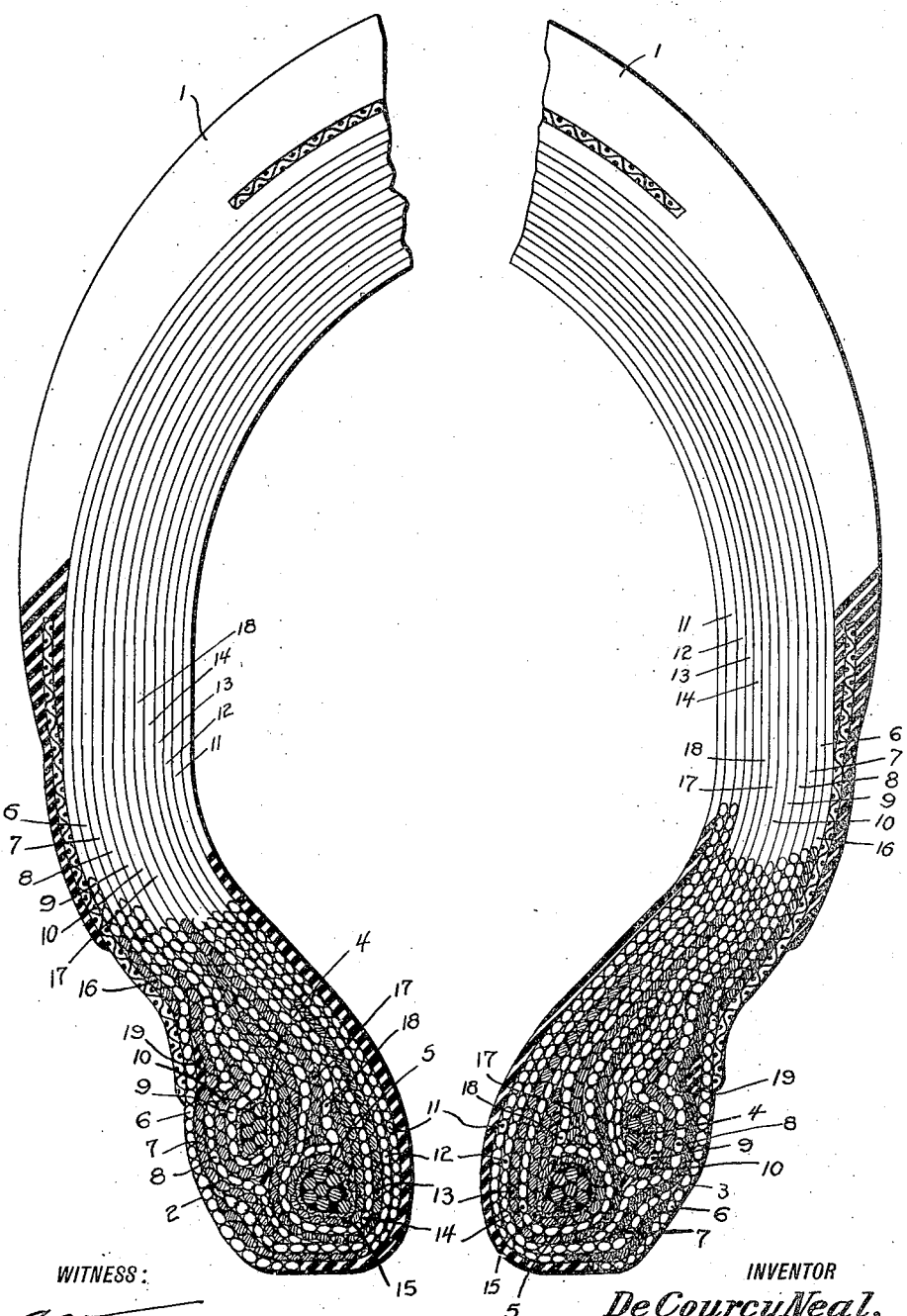
WITNESS:
S. G. Taylor
INVENTOR
De Courcy Neal,
BY
Ernest Hopkins
HIS ATTORNEY

UNITED STATES PATENT OFFICE.

DE COURCY NEAL, OF DETROIT, MICHIGAN, ASSIGNOR TO MORGAN & WRIGHT, A CORPORATION OF MICHIGAN.

TIRE-CASING.

1,341,663.  Specification of Letters Patent.  Patented June 1, 1920.

Application filed June 30, 1916. Serial No. 106,755.

*To all whom it may concern:*

Be it known that I, DE COURCY NEAL, a citizen of the United States, residing at Detroit, county of Wayne, and State of Michigan, have invented certain new and useful Improvements in Tire-Casings, of which the following is a full, clear, and exact description.

This invention relates to tires, and more particularly to tire casings made up of a series of superposed layers of fabric or the like secured or anchored interiorly.

Two objections have been found to casings of this type, as heretofore made, namely; they have been subject to rim-cutting or chafing of the outer walls, due to excessive flexing adjacent the upper edge of the rim; and second, they have tended to rise or blow off of the rim to which attached, due to the practice of binding the inner plies of material only, thus allowing the outer plies to creep in use along the rim surface.

It has accordingly been my object to overcome these objections and at the same time to produce a tire of simple construction without materially increasing the manufacturing cost.

In the accompanying drawing which illustrates one of the various possible embodiments of the invention, a tire casing in cross-section partially broken away, is shown, part of the cross-hatching being omitted to indicate more clearly the position of the fabric layers.

Referring now to the drawing in detail, the numeral 1 indicates the rubber tread portion of the casing which includes bead portions 2 and 3. The main body of the casing is made up of a series of superposed layers of cord fabric, comprising an inner set of plies and an outer set. The arrangement of these layers and their securing means on one side of the tire is substantially duplicated in reversed position on the opposite side of the tire. Hence a description of one side of the tire only will be given, it being understood that the various plies of fabric extend from one side to the other, except in one instance hereinafter noted, and are arranged at the bead, substantially identically on either side. The outer set of plies of the cord fabric are disposed about a set of bead wires 4 the inner set being disposed about a similar set of bead wires 5. The outer set comprises superficial plies 6, 7 and 8 which pass to a position below the set of bead wires 4 and terminate without forming a loop thereabout. Central ply 9 which is immediately adjacent bead wires 4, and central ply 10 which is next to ply 9, surround and form a loop about the bead wires 4. The inner set comprises superficial plies 11 and 12 which pass below bead wires 5 and terminate without forming a loop thereabout and central plies 13, 14 and 15 which surround the bead wires 5 and form a loop thereabout. According to this construction plies 6 to 15 inclusive form a successive series of superposed plies. Ply 15 is short and does not extend transversely from side to side of the casing, but terminates a short distance above bead wires 5, that is, terminates a short distance from the bead wires 5 in a direction, radially outward, relative to the center of the tire.

The extremities of the superficial plies 6 and 7 which project inwardly, with respect to the casing, are separated and form a lapped joint with the outwardly projecting extremities of superficial plies 11 and 12.

Ply 16, associated with the superficial plies of the outer set and plies 17 and 18 which are associated with the central plies of the inner set, terminate above their respective bead wires, that is, terminate at a point radially outward of the bead wires, relative to the center of the tire. Ply 16 is superposed upon ply 6, and plies 17 and 18 which adjoin one another have extremities which are disposed within the loop made by ply 14. The latter plies aid in preserving the position of the loops and serve a purpose with respect to the inner set of plies similar to that performed by rubber strip 19 with respect to the outer set.

It will be noted that bead wire 4 is positioned above and outwardly from bead wire 5 and is approximately in line with the upper edge of the rim flange thus stiffening the structure and preventing excessive flexing at this point. Further, plies 13, 14 and 15 which form loops about the bead wire 5, pass between the two sets 4 and 5, the bead wires thus not only serving to exert circumferential pressure, but also by virtue of their relative positions exerting lateral pressure to hold the plies securely in position, By thus binding both the inner and outer plies and positioning the second set of bead wires at about the height of the rim flange the defects of rim-cutting, chafing, and creeping, are effectively overcome, and in general the objects of the invention are achieved, the construction being simple and requiring little or no extra labor in manufacture.

As many apparently widely different embodiments of this invention could be made without departing from the spirit thereof, it is to be understood that I do not intend to limit myself to the specific disclosure of the invention set forth, except as indicated in the appended claims.

Having thus described my invention what I claim and desire to protect by Letters Patent is:

1. A tire body comprising an inner and an outer anchor member adjacent each rim engaging edge of the tire body, outer and inner sets of plies for each of said members, each of said sets of plies comprising superficial plies and central plies, the latter of which plies are looped about their respective anchor members, and the edges of the central plies of the inner set of plies extending between the two anchor members.

2. A tire body comprising an inner and an outer anchor member adjacent each rim engaging edge of the tire body, outer and inner sets of plies for each of said members, each of said sets of plies comprising superficial plies and central plies, the latter of which plies are looped about their respective anchor members, and the edges of the superficial plies of the outer and inner sets of plies lapping joints.

3. A tire body comprising an inner and an outer anchor member adjacent each rim engaging edge of the tire body, outer and inner sets of plies for each of said members, each of said sets of plies comprising superficial plies and central plies, the latter of which plies are looped about their respective anchor members, and additional plies associated with the central plies of the inner set of plies and terminating above the inner anchor member.

Signed at Detroit, county of Wayne, State of Michigan, this 20th day of June, 1916.

DE COURCY NEAL.